United States Patent Office 3,124,446
Patented Mar. 10, 1964

3,124,446
CONTROLLING THE GROWTH OF UNDESIRED VEGETATION
Margaret D. Cameron, Beaumont, Tex., assignor to Monsanto Chemical Company, St. Louis, Mo., a corporation of Delaware
No Drawing. Filed Oct. 9, 1958, Ser. No. 766,204
9 Claims. (Cl. 71—2.3)

This invention relates to the use of 1-ethynylcyclohexanol and of 1-(1-propynyl)cyclohexanol as herbicides.

Herbicidal materials may be used for the elimination of undesirable vegetation either by applying the herbicides to media normally supporting plant growth, e.g., seed-containing soils, or by exposing the foliage of the unwanted flora to contact with a phytotoxic amount of the herbicidal composition. Herbicidal chemicals may be effective in one or the other, or both of these modes of application. Those compositions which are effective preventatives of plant growth and which, to produce their herbicidal effect, are applied, e.g., to soils, before the emergence of the growth are known as pre-emergent herbicides. Compositions effective on living plants may be designated as foliage application or contact herbicides.

In addition to the classification of herbicides into the overlapping classes of pre-emergent and foliage application types, another division into which herbicidal compositions may be grouped directs attention to the botanical spectrum of effectiveness of such compositions. Many, and indeed probably most of the known herbicidal materials have a phytotoxicity which is in effect discriminatory, in that one or another plant species will be found to be more or less resistant to its attack. However, of economic importance are the herbicidal compositions which exhibit perferential toxicity to broad classes of plants, rather than to isolated species. An important botanical classification divides many of the most widespread plant species into those which are broad-leaved and those which are narrow-leaved. The narrow-leaved plants include the grasses; among the broad-leaved plants are most agricultural crops, with the exception of the grains, such as wheat, which are narrow-leaved. It has been found that certain herbicidal materials will exhibit preferential phytotoxicity for one or the other of these classes, i.e., of broad-leaved and of narrow-leaved plants; this is of particular economic significance in that it enables chemical weeding of crops. A narrow-leaved grassy or crop plant, for example, may be left unharmed by the same concentration of herbicide which is phytotoxic to broad-leaved weeds infesting the lawn or narrow-leaved crop acreage.

I have now made the surprising discovery that 1-ethynylcyclohexanol at certain concentrations is selectively phytotoxic to broad-leaved plant species. At higher concentrations, this compound prevents germination and/or growth of both broad-leaved and narrow-leaved plants and is also effective as a foliage spray. 1-(1-propynyl)cyclohexanol is of interest in that it may be used to totally prevent plant growth when used in concentrations of about 25 lbs./acre; but it is of particular importance in that when the concentration of the present alcohol in the emulsion is decreased to, say, 5 lbs./acre, there is apparent a selectivity of effect, whereby growth of most broad-leaved plants is prevented while narrow-leaved plants such as wild oat or corn are unaffected. The present invention thus provides a very effective means of suppressing or entirely preventing the growth of broad-leaved weeds in fields of crop plants such as corn and other cereal grains.

Of particular interest is the delaying action of 1-(1-propynyl)cyclohexanol at borderline concentrations on germinating seeds. Seeds of broad-leaved plants in plots which have been treated with the alkanol may fail to germinate for 3 to 5 days after the seeds from untreated plots have emerged. After this 3 to 5 day lag, the seeds germinate and plants emerge without apparent abnormalities. However, their growth rate appears to be reduced for an additional time interval. The 1-(1-propynyl)cyclohexanol behaves like a respiratory inhibitor, i.e., the seeds appear to be anesthetized for various intervals. The growth regulatory action is of interest in retarding blossom and fruit bud development in order to escape frost injury. When used as a foliage spray, at certain concentrations with some plants 1-(1-propynyl)cyclohexanol has been found to cause complete growth cessation for a period of 2 to 3 weeks with a minimum of lethal action on the sprayed plants.

In pre-emergent weed control, the seedbed is prepared, e.g., by loosening the soil, and then the herbicidal chemical is applied to the soil, either before or after the crop is planted. In application of highly effective herbicides such as the present 1-ethynylcyclohexanol only very low concentrations, e.g., from 5 to 8 lbs. per acre or less, need be applied to the soil to obtain good results against broad-leaved plants. Since most of the weed seeds which germinate at any one time come from the upper ⅛ to ½ inch of soil, pre-emergent herbicides generally need be applied only to the surface of acreage under cultivation. To assure even distribution of the relatively small amounts required, either the 1-ethynylcyclohexanol or the 1-(1-propynyl)cyclohexanol may be incorporated with a solid carrier, which may be an inert dust, e.g., talcum, clay, pumice or bentonite, or a carrier which is itself an agricultural chemical, e.g., fertilizer, etc. Another convenient method of applying the present compounds to soils or foliage consists of spraying a solution or emulsion of either the 1-ethynylcyclohexanol or of the 1-(1-propynyl)cyclohexanol onto the seedbed or plants. A liquid spray suitable for application in this way may be prepared by dissolving the compounds in an organic solvent, such as a petroleum solvent, e.g., naphtha; the expenditure of large volumes of organic solvents may be avoided, if desired, by extending a concentrated solution of either the 1-ethynylcyclohexanol or the 1-(1-propynyl)cyclohexanol in an organic solvent by addition of an emulsifying agent and then water, to prepare an oil-in-water emulsion of the herbicidal compound. By the word "oil" is meant here an organic solvent insoluble in, or immiscible with, water. As emulsifying agents for such purposes may be used any of the common surface-active emulsion adjuvants, e.g., alkylbenzenesulfonates, long-chain polyalkylene glycols, salts of sulfated fatty acid amides, etc. Surface-active agents may also be used to produce a temporary suspension or dispersion of either the present 1-ethynylcyclohexanol or the 1-(1-propynyl)-cyclohexanol in water, without the intervention of an organic solvent, if desired. Oil-in-water emulsions of the present compounds, which may readily be prepared to contain low concentrations, e.g., from 0.1 percent to 2 percent of active herbicidal ingredient by weight, are a particularly convenient form for use in applying either the 1-ethynylcyclohexanol or the 1-(1-propynyl)cyclohexanol in the small concentrations required for these compounds to produce excellent contact spray and/or pre-emergent weed control.

The presently useful 1-(1-propynyl)cyclohexanol is a new compound which forms the subject of my copending application, Serial No. 766,181, filed of even date, now abandoned, wherein there is described preparation of the compound by the reaction of lithium methylacetylide and cyclohexanone.

The invention is further illustrated, but not limited, by the following examples:

Example 1

This example shows pre-emergent herbicide evaluation of 1-ethynylcyclohexanol, 1-(1-propynyl)cyclohexanol, and three other acetylenic cycloalkanols as pre-emergent herbicides. Briefly, the test chemicals were applied in spray form to soil seeded to representative grasses and broad-leaved plants. Aluminum pans 13" x 9" x 2" were filled with top soil which had been screened through a ¼" wire mesh and mixed with sand in a preparation of 2 parts of top soil to one part of sand. After compacting the soil surface to a depth of ⅜" from the top of the pan, 20 seeds each of the following were scattered randomly and then covered with soil to the pan top:

1—Wild oat
2—Brome grass
3—Rye grass
4—Buckwheat
5—Radish
6—Red clover
7—Sugar beet
8—Cotton
9—Cucumber Respective solutions of the following acetylenic cycloalkanols were prepared:

1-ethynylcyclohexanol
1-(1-propynyl)cyclohexanol
1-(2-propynyl)cyclohexanol
1-ethynyl-2,3,5-trimethylcyclohexanol
1-ethynylcyclopentanol The test solutions were prepared by dissolving 0.4 g. of each of these compounds in 20 cc. of acetone and then diluting 10 ml. of each solution with water to make up 30 cc. of test material. Application of this quantity of the solution to said pans is calculated to correspond to the use of 25 lbs. of the acetylenic cycloalkanol per acre.

The planted pans were then placed in an exhaust hood, and sprayed first with 30 cc. of an aqueous solution of a liquid fertilizer, then with an 0.1% solution of octamethyl pyrophosphoramide and finally with the 30 cc. solution of one of the test compounds. The liquid fertilizer was employed to give a uniform nutrition level and the amide was employed to prevent insect injury. One of the pans which had been similarly seeded and treated with the liquid fertilizer and octamethyl pyrophosphoramide but not with the acetylenic cycloalkanol was set aside to be used as a "blank." The pans were then placed in ½" of water and allowed to absorb moisture through perforated bottoms until the soil surface was completely moist. The pans were then transferred to a wet sand bench in the greenhouse and maintained there for 10 days under ordinary conditions of sunlight and watering.

The following table shows results noted at the end of that time, the extent of effect being given by the following code:

0=No effect on emergence and growth of plants
1=Slight effect on emergence and growth of plants
2=Moderate effect on emergence and growth of plants
3=Complete prevention of germination and growth

| Test Chemical | Plant Code Number | | | | | | | | |
|---|---|---|---|---|---|---|---|---|---|
| | 1 | 2 | 3 | 4 | 5 | 6 | 7 | 8 | 9 |
| 1-Ethynyl-2,3,5-trimethyl-cyclohexanol | 0 | 0 | 0 | 0 | 0 | 0 | 0 | 0 | 0 |
| 1-Ethynylcyclopentanol | 0 | 0 | 0 | 0 | 0 | 0 | 0 | 0 | 0 |
| 1-(2-Propynyl)-cyclohexanol | 0 | 0 | 0 | 0 | 0 | 0 | 0 | 0 | 0 |
| 1-Ethynylcyclohexanol | 1 | 3 | 0 | 2 | 3 | 3 | 3 | 3 | 3 |
| 1-(1-Propynyl)-cyclohexanol | 3 | 3 | 3 | 3 | 3 | 3 | 3 | 3 | 3 |

The present test data show that 1-ethynyl-2,3,5-trimethylcyclohexanol and 1-ethynylcyclopentanol and 1-(2-propynyl)cyclohexanol have no effect as pre-emergent herbicides; whereas 1-ethynylcyclohexanol completely suppresses the broad-leaved plants, has no effect on rye grass and only a slight effect on wild oat; and 1-(1-propynyl)cyclohexanol completely prevents germination and growth of all of the test plants.

Example 2

Testing of 1-(1-propynyl)cyclohexanol was conducted as in Example 1, except that the compound was employed at a 5 lb./acre rate. The following effects on germination and growth were observed:

| | |
|---|---|
| Wild oats | No effect. |
| Brome grass | Moderate effect. |
| Rye grass | Slight effect. |
| Buckwheat | Complete prevention. |
| Radish | Complete prevention. |
| Red clover | Complete prevention. |
| Sugar beet | Complete prevention. |
| Cotton | Complete prevention. |
| Cucumber | Moderate effect. |
| Corn | No effect. |

Example 3

In this example the pre-emergent herbicidal activity of 1-ethynylcyclohexanol is compared with that of 1-ethynyl-2-methylcyclohexanol. Testing was conducted on a larger scale, substantially as described in Example 1, and the test chemicals were used at concentrations of 8 lbs. or 6 lbs. per acre in respective tests. "Blanks" as defined in Example 1 were prepared. The "blanks" and the pans which had been sprayed with the test chemicals were kept in the same greenhouse for 10 days under ordinary conditions of sunlight and watering. At the end of that time the number of live plants of each variety in the test and "blank" pans were counted and expressed on a percentage basis in reference to 100% for the "blank." The following results were obtained:

| Plant | Live Plants, Percent of Blank, with— | | | |
|---|---|---|---|---|
| | 1-Ethynylcyclohexanol at lbs./acre | | 1-Ethynl-2-methylcyclohexanol at lbs./acre | |
| | 8 | 6 | 8 | 6 |
| Wild Oat | 96 | 92 | 98 | 102 |
| Rye Grass | 88 | 76 | 115 | 105 |
| Radish | 0 | 0 | 76 | 76 |
| Red Clover | 0 | 0 | 93 | |
| Sugar Beet | 4 | 9 | 109 | 119 |
| Cotton | 8 | 0 | 85 | 85 |
| Corn | 87 | 100 | 73 | 100 |

The above data clearly shows that 1-ethynylcyclohexanol is effective against the broad-leaved plants radish, red clover, sugar beet and cotton, the number of live plants in pans treated with the 6 lbs./acre and 8 lbs./acre concentration of this chemical being only from 0–9% of the number of live plants in the "blank." At these concentrations of 1-ethynyl-2-methylcyclohexanol, however, no such pronounced selective effect is noted. Soil treated with the 1-ethynyl-2-methylcyclohexanol actually seems to have a growth-promoting rather than retarding effect on either some of the narrow-leaved or some of the broad-leaved test plants. Thus, more live plants of both rye grass and sugar beets were present in pans of soil treated with 1-ethynyl-2-methylcyclohexanol than were present in the untreated "blank" pans. Whereas 1-ethynyl-2-methylcyclohexanol had a slight retarding effect on radish, it also had a slight retarding effect on corn.

Actually 1-ethynylcyclohexanol is a very efficient pre-emergent selective herbicide against broad-leaved plants when applied to soils normally supporting the growth of plants, whereas 1-ethynyl-2-methylcyclohexanol under the same test conditions demonstrates little, if any, herbicidal effect and shows no selective action against broad-leaved versus narrow-leaved plants.

*Example 4*

1-ethynyl-1-cyclohexanol was tested against wild oat, rye grass, corn, radish and red clover at a 4 lbs./acre rate, employing the general testing procedure of Example 2. There was noted at the end of 10 days 98% growth of wild oat, 107% growth of rye grass and 100% growth of corn, based on the number of these plants in the simultaneously run "blank"; however, there were absolutely no radish and red clover plants. The results obtained with 1-ethynyl-2-methylcyclohexanol tested at the same time were 100% for wild oat, 95% for rye grass, 87% for corn, 96% for radish and 93% for red clover.

*Example 5*

Contact spray herbicide tests were conducted as follows on the following compounds:

(I)  1-(1-propynyl)cyclohexanol
(II) 1-(2-propynyl)cyclohexanol

Pan flats were seeded with the grasses and broad-leaved plants and watered with an aqueous solution of fertilizer and insecticide (octamethyl pyrophosphoramide) as described in Example 1. The pans were then saturated with water and left in the greenhouse for 2 weeks. The resulting germinated plants were then sprayed to run off with either an 0.5% aqueous solution of (I) or of (II). The pans of sprayed plants were then kept in the greenhouse under standard conditions of sunlight and watering. Observation of the plants at the end of that time showed that those of the grasses which had been sprayed with (I) were slightly injured and those of the broad-leaved plants which had been sprayed with (I) were dead. On the other hand, all of the grasses and broad-leaved plants in the pan of plants which had been sprayed with (II) were alive and flourishing.

The 1-ethynylcyclohexanol and the 1-(1-propynyl)cyclohexanol may be used with marked effectiveness for the chemical weeding of agricultural crops. For this purpose, they may be applied with particular facility at the low concentrations required by employing emulsions of the compounds formulated as described hereinabove. They may be used alone; or, if desired, they may be applied to soils in combination with other agricultural compositions. Further modifications and applications will be obvious to those skilled in the art.

This application is a continuation-in-part of my application, Serial No. 580,182, filed April 24, 1956, and of my application, Serial No. 580,192, filed April 24, 1956, both now abandoned.

What I claim is:

1. A method for the control of undesired vegetation which comprises applying to said vegetation a growth inhibiting amount of an acetylenic alcohol selected from the class consisting of 1-ethynylcyclohexanol and 1-(1-propynyl)cyclohexanol.

2. A method for the control of undesired vegetation which comprises applying to said vegetation a growth inhibiting quantity of 1-(1-propynyl)cyclohexanol.

3. A method for preventing germination and growth of undesired plants which comprises applying to media normally supporting said germination and growth an acetylenic alcohol selected from the class consisting of 1-ethynylcyclohexanol and 1-(1-propynyl)cyclohexanol, said alcohol being applied to said media in a quantity which prevents germination and growth of said plants.

4. A method for preventing germination and growth of undesired plants which comprises applying 1-ethynylcyclohexanol to media normally supporting said germination and growth, said 1-ethynylcyclohexanol being applied to said media in a quantity which prevents germination and growth of the plants.

5. A method for preventing germination and growth of undesired plants which comprises applying 1-(1-propynyl)cyclohexanol to media normally supporting said germination and growth, said 1-(1-propynyl)cyclohexanol being applied to said media in a quantity which prevents germination and growth of the plants.

6. A method for preventing germination and growth of undesired plants which comprises applying to soils normally supporting said germination and growth and acetylenic alcohol selected from the class consisting of 1-ethynylcyclohexanol and 1-(1-propynyl)cyclohexanol, said alcohol being applied to said soils in a quantity which prevents germination and growth of said plants.

7. A method for preventing germination and growth of undesired plants which comprises applying 1-ethynylcyclohexanol to soils normally supporting said germination and growth, said 1-ethynylcyclohexanol being applied to said soils in a quantity which prevents germination and growth of the plants.

8. A method for preventing germination and growth of undesired plants which comprises applying 1-(propynyl)cyclohexanol to soils normally supporting said germination and growth, said 1-(1-propynyl)cyclohexanol being applied to said soils in a quantity which prevents germination and growth of the plants.

9. A method for the control of undesired vegetation which comprises applying to said vegetation a growth inhibiting amount of 1-ethynyl cyclohexanol.

References Cited in the file of this patent

UNITED STATES PATENTS

| | | |
|---|---|---|
| 1,841,768 | Straus et al. | Jan. 19, 1932 |
| 2,250,445 | Brusan et al. | July 29, 1941 |
| 2,576,311 | Schlesinger et al. | Nov. 27, 1951 |
| 2,657,126 | Stewart et al. | Oct. 27, 1953 |
| 2,726,269 | Humphlett | Dec. 6, 1955 |

OTHER REFERENCES

Berichte: 75B, pages 356 to 361 inc. (page 356 applied), 1942.

Zeile et al.: Chemical Abstracts, vol. 37, col. 3047, 1943.

Henbest et al.: Chemical Abstracts, vol. 44, col. 2934(i), 1950.

Saunders: Chem. Abstracts, vol. 44, col. 2457(h), 1950.

King: U.S. Dept. Agric. Handbook No. 69, May 1954, page 136.

Nazarov et al.: Chem. Abstracts, vol. 49, col. 927(f), 1954 article.

Sokolova: Chem. Abstracts, vol. 49, cols. 13119 and 13120, 1954 article.